US006098547A

United States Patent [19]

West

[11] Patent Number: 6,098,547

[45] Date of Patent: Aug. 8, 2000

[54] ARTILLERY FUSE CIRCUMFERENTIAL SLOT ANTENNA FOR POSITIONING AND TELEMETRY

[75] Inventor: James B. West, Cedar Rapids, Iowa

[73] Assignee: Rockwell Collins, Inc., Cedar Rapids, Iowa

[21] Appl. No.: 09/088,353

[22] Filed: Jun. 1, 1998

[51] Int. Cl.[7] ................................ F42C 13/04; F41G 7/00; H01Q 1/28; H01Q 15/08; B64D 1/04

[52] U.S. Cl. ........................... 102/214; 89/1.11; 244/3.14; 244/3.21; 343/700 MS; 343/708; 343/911 R

[58] Field of Search ..................................... 102/214, 211, 102/293; 343/700 MS, 911 R, 767, 708; 244/3.14, 3.21, 3.22; 89/1.11

[56] References Cited

U.S. PATENT DOCUMENTS

| | | | |
|---|---|---|---|
| 2,996,713 | 8/1961 | Boyer | 343/700 MS |
| 3,732,564 | 5/1973 | Kuck et al. | 343/7 PF |
| 4,245,222 | 1/1981 | Eng et al. | 343/708 |
| 4,280,355 | 7/1981 | Donnally et al. | 73/5 |
| 4,431,996 | 2/1984 | Milligan | 343/708 |
| 4,457,206 | 7/1984 | Toulios et al. | 89/14 R |
| 4,697,189 | 9/1987 | Ness | 343/700 MS |
| 4,726,291 | 2/1988 | Lefranc | 102/214 |
| 4,994,820 | 2/1991 | Suzuki et al. | 343/846 |
| 5,041,838 | 8/1991 | Liimatainen et al. | 343/700 MS |
| 5,131,602 | 7/1992 | Linick | 244/3.14 |
| 5,192,827 | 3/1993 | Jasper, Jr. | 89/1.11 |
| 5,202,697 | 4/1993 | Bonebright et al. | 343/770 |
| 5,379,968 | 1/1995 | Grosso | 244/3.21 |
| 5,425,514 | 6/1995 | Grosso | 244/3.22 |
| 5,706,015 | 1/1998 | Chen et al. | 343/700 MS |
| 5,864,318 | 1/1999 | Cosenza et al. | 343/700 MS |

FOREIGN PATENT DOCUMENTS

| | | |
|---|---|---|
| 000444416A1 | 1/1991 | European Pat. Off. . |
| 000809084A1 | 5/1997 | European Pat. Off. . |
| 409289415A | 11/1997 | Japan . |

OTHER PUBLICATIONS

IBM Technical Disclosure, "Cooperative Collision Avoidance System", vol. 38, No. 2, Feb. 1995.

IBM Technical Disclosure, "Global Positioning System Receiver Simulation", vol. 37, No. 4B, Apr. 1994.

*Primary Examiner*—Theodore M. Blum
*Assistant Examiner*—Fredrick T. French, III
*Attorney, Agent, or Firm*—Nathan O. Jensen; Kyle Eppele; J. P. O'Shaughnessy

[57] ABSTRACT

An antenna for utilization in a fuse of an artillery shell or the like. The antenna includes a dielectric disk having upper and lower surfaces, a radiator disposed on the upper surface of the dielectric disk, a ground plane disposed on the lower surface of said dielectric disk, and a plurality of spaced apart apertures radially disposed through the dielectric disk for coupling the radiator to the ground plane.

26 Claims, 4 Drawing Sheets

ARTILLERY FUSE CIRCUMFERENTIAL SLOT ANTENNA FOR POSITIONING AND TELEMETRY

FIELD OF THE INVENTION

The present invention generally relates to the field of artillery fuses, and particularly to an antenna for utilization in an artillery fuse.

BACKGROUND OF THE INVENTION

Artillery shells typically utilize a fuse installed at the leading end of the shell. The fuse is a mechanical or electronic device designed to control the detonation of the explosive charge of the shell. Modern artillery fuses further include electronics and telemetry systems for improved accuracy and detonation control. The electronic circuits disposed in the fuse remain in radio-frequency contact with a ground station after launch of the shell for coordinating the trajectory of the shell, making course corrections as necessary. Further, the artillery fuse may operate in conjunction with a satellite based positioning system such as the NAVSTAR global positioning system (GPS), maintained and operated by the United States government, for accurately determining the coordinates of the shell as it travels along its trajectory and reaches the point of impact, and for correcting the trajectories of subsequently fired munitions.

An artillery fuse having telemetry and positioning system electronics requires an antenna suitable for the application and environment to which an artillery shell is subject. The fuse antenna should be able to survive the extreme acceleration and high rotational velocities typical of gun launched projectiles. Further, the radiation pattern of the antenna should exhibit relatively high gain in the aft direction, the direction opposite to the direction of travel of the shell. The radiation pattern of the antenna should be minimal in the direction of travel of the shell to minimize or prevent jamming from the vicinity of the target area of the shell. Such an antenna should be of a sufficiently reduced size so as not to occupy a large amount of space within the interior of the fuse, and is desirably designed for operation with L-band and S-band signals. ("L" is the letter designation for microwave signals in the frequency range from 1 to 2 GHz and "S" is the letter designation for microwave signals in the frequency range from 2–4 GHz.)

The performance of prior antenna configurations such as patch-array designs are subject to performance degradation effects including carrier-phase roll-up and roll-ripple due to antenna asymmetry. It would be desirable to provide an antenna having azimuthal symmetry to avoid such performance degrading problems. It would be further desirable to provide an antenna that does not require power combiners or impedance matching, and that does not suffer impedance loss typical with prior antenna implementations.

SUMMARY OF THE INVENTION

The present invention is directed to an antenna for utilization in a fuse of an artillery shell or the like. In one embodiment of the invention, the antenna includes a dielectric disk having upper and lower surfaces that each form a ground plane, a radiator disposed on the upper and lower surface of the dielectric disk and a plurality of spaced apart apertures radially disposed through the dielectric disk for coupling the radiator to the ground plane. The dielectric loaded gap between the ground planes form a circumferential slot antenna between the ground planes.

The present invention is further directed to a fuse for utilization with an artillery shell or the like. In one embodiment of the invention, the fuse includes an outer shell having an interior portion and a base, and an antenna disposed within the interior surface generally parallel to said base, the antenna comprising a dielectric disk having upper and lower metal surfaces and a plurality of spaced apart apertures radially disposed through the dielectric disk for coupling the ground planes.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
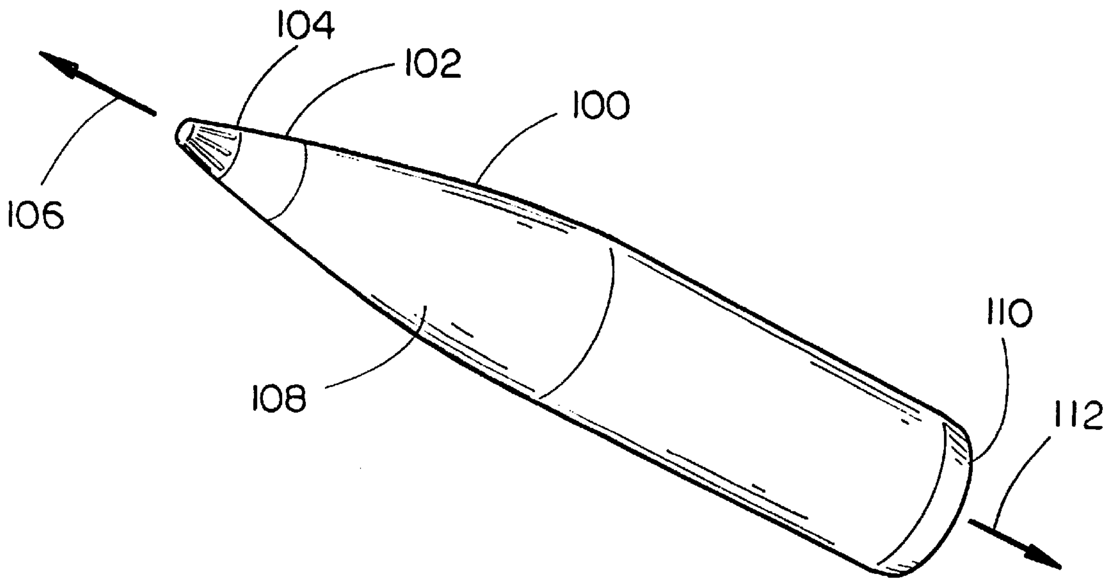
FIG. 1 is an illustration of an artillery shell in which the antenna of the present invention is utilized.

Referring now to FIG. 1, an artillery shell in accordance with the present invention is shown. The artillery shell 100 or similar munition is typically launched or fired from a cannon, mortar, or similar type of gun (not shown). A fuse 104 is disposed at the nose 102 of shell 100 and is typically physically contiguous with the body 108 of shell 100. A fuse, or fuze, is a mechanical or electronic device utilized for detonating an explosive charge such as the charge of an artillery shell or similar munition. Shell 100, when launched or otherwise projected, travels in a forward direction 106 toward the vicinity of a target. During flight, the rear 110 of shell 100 generally points in the aft direction 112 toward the vicinity of origin of shell 100, i.e. toward the gun from which shell 100 is launched.

Figure 2:
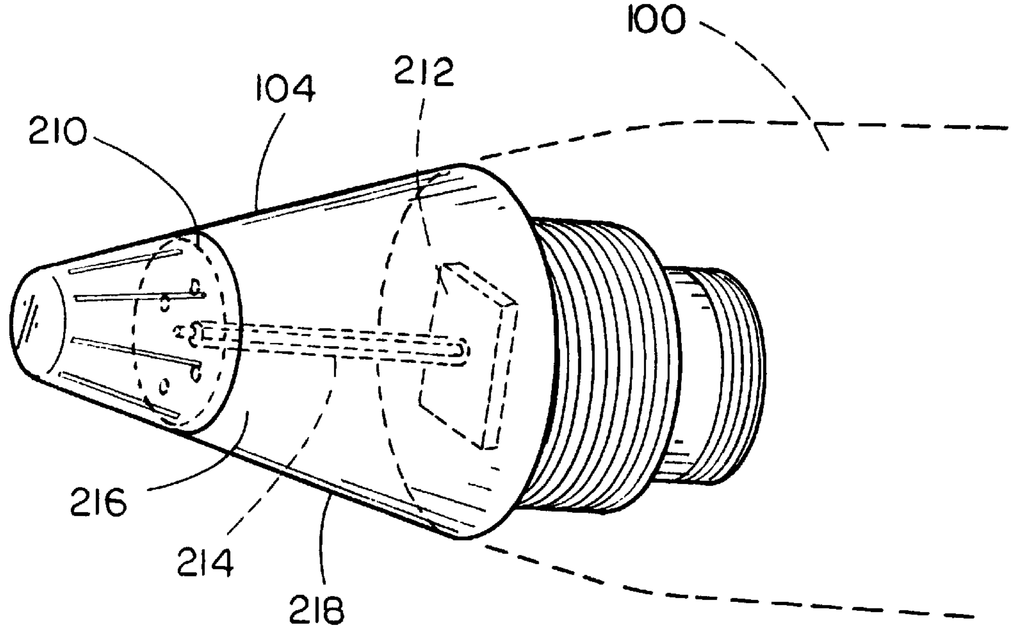
FIG. 2 is an illustration of the antenna of the present invention utilized in the fuse of an artillery shell.

Referring now to FIGS. 2, an artillery shell fuse incorporating the antenna of the present invention is shown. Antenna 210 is preferably a disk or discoidally shaped structure, or circumferential slot antenna. Antenna 210 is disposed in the interior cavity 216 of fuse 104. Antenna 210 is utilized for receiving or transmitting electromagnetic signals in conjunction with electronic circuitry 212 also disposed in the interior cavity 216 of fuse 104. Electronic circuitry 212 couples with antenna 210 via an RF feed transmission line 214. RF feed 214 is preferably a coaxial cable having electrical characteristics compatible with antenna 210 and electronic circuitry 212 (e.g., having a characteristic impedance suitable for coupling the impedance of antenna 210 to the output or input impedance of electronic circuitry 212.) Antenna 210 and electronic circuitry 212 may be utilized in fuse 104 to provide telemetry and positioning functions for shell 100, for example, autoregistration, range control, accuracy improvement, tracking, detonation control, etc.

Figure 3:
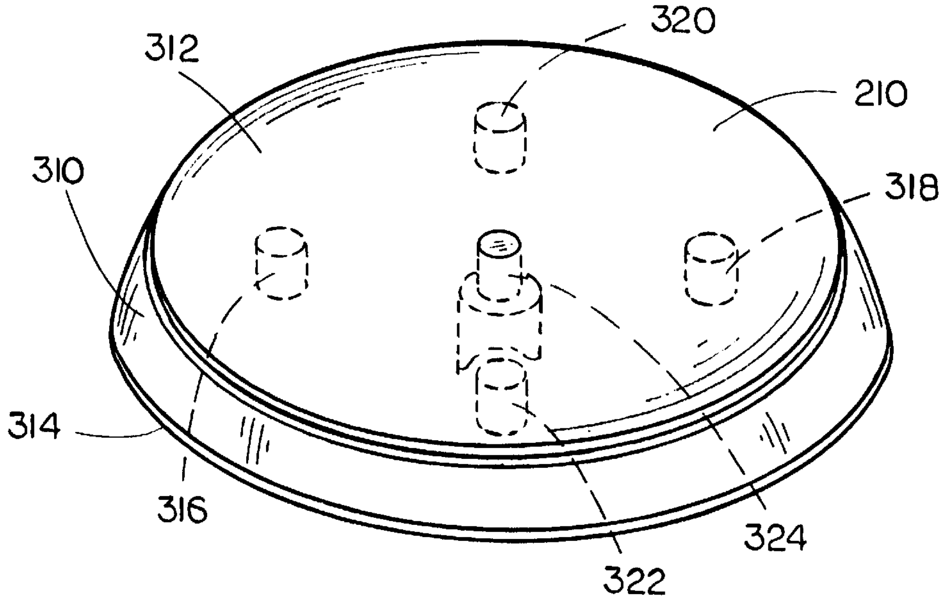
FIGS. 3 and 4 are an isometric elevation views, respectively, of the antenna of the present invention.
Figure 4:
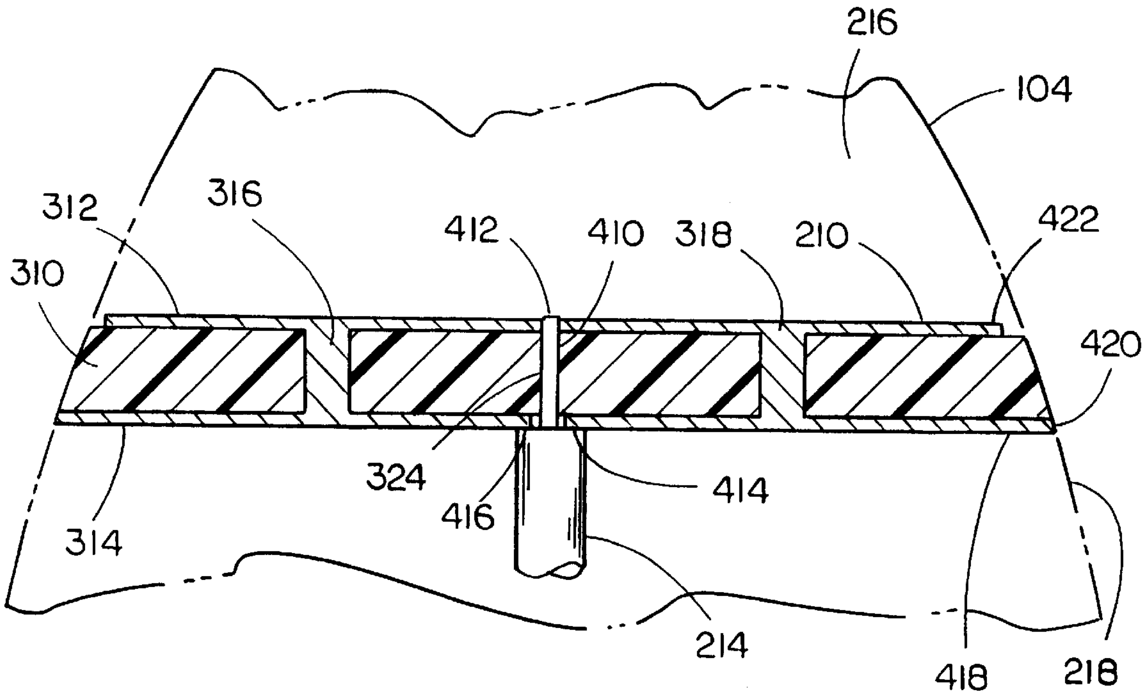

Referring now to FIGS. 3 and 4, an isometric view and an elevation view of the antenna of the present invention are shown, respectively. Antenna 210 comprises a disk or discoidally shaped structure defined by a dielectric disk 310. Antenna 210 is comprised of dielectric disk 310, with two ground planes 312 and 314 disposed on the top and bottom surfaces of dielectric disk 310. Dielectric disk 310 insulates grounding planes 312 and 314, thereby forming a circumferential slot configuration antenna. Dielectric disk 310 preferably comprises a low loss dielectric material having dielectric constant on the order of 3 or 4, preferably 3.38. Antenna 210 is preferably formed by depositing ground planes 312 and 314 on a circuit board type material formed into a discoid structure by metal deposition such that ground planes 312 and 314 comprise metallization layers on opposite surfaces of dielectric disk 310.

Dielectric disk 310 includes a pair of apertures 316 and 318 formed therethrough. Apertures 316 and 318 are spaced apart and radially disposed with respect to the center of dielectric disk 310. Alternatively, two additional apertures 320 and 322 may be formed through disk 310 such that a total of four (or more) spaced apart and radially disposed apertures are formed through disk 310. During the metal deposition process by which ground planes 312 and 314 are formed, metal is deposited on the interior surfaces of apertures 316, 318, 320 and 322 such that ground plane 312 electrically couples with ground plane 314 via apertures 316–322. In such a configuration, apertures 316–322 form inductive posts that tune the center frequency and bandwidth of antenna 210 via inductive loading. Via inductive loading, apertures 316–322 increase the effective electrical size of antenna 210 without altering its physical diameter. Additionally, disk 310 and ground planes 312 and 314 include a central aperture 324 for allowing a conductor of RF feed 414 to couple to the slot radiator between ground planes side of 312 and 314 of disk 310.

In a preferred embodiment of the invention, antenna 210 comprises a monolithic structure capable of withstanding the dynamically harsh environment of accelerations greater than or equal to 35,000 g's (where 1 g is the acceleration caused by the earth's gravitational field at seal level) and roll rates greater than or equal to 21,000 revolutions per second such as typically experienced by shell 100 during flight. The dipole design of antenna 210 is azimuthally symmetric, thereby providing immunity to carrier-phase roll-up and roll-ripple. Antenna 210 is mechanically robust, low volume, and low cost and does not require power combiners or impedance matching typically required on asymmetrical antenna designs. Consequently, antenna 210 does not suffer the additional power loss of antennas requiring power combiners or impedance matching. The impedance of antenna 210 is preferably approximately 50 ohms.

Antenna 210 is designed to be utilized at either L-band (1–2 GHz) or S-band (2–4 GHz) frequencies, and may be optimized to be utilized at both L-band and S-band frequencies (1–4 GHz). For both L-band and S-band frequencies, antenna 210 is constructed from a solid, short, cylindrical disk 310 of low loss dielectric material metallized on the top and bottom flat surfaces to thereby form ground plane 312 and ground plane 314. Antenna 210 may be slightly tapered to accommodate the contour of an ogivally shaped fuse 104 as shown in FIG. 4. Antenna 210 has a single-point RF feed conductor 214 connected at the center of disk 310. The center conductor 410 of RF feed 214 is connected to ground plane 312 at point 412. The outer conductor 414 of RF feed 214 couples to ground plane 314 at point 416. The diameter of disk 310, dielectric constant of disk 310, and the number, spacing and diameter of the inductive apertures 316–322 adjust the center frequency and bandwidth of antenna 210. The inductive apertures 316–322 further allow other transmission lines (e.g., DC power, ground and digital control signals) to pass through antenna 210 from one section of fuse 104, or shell 100, to another if desired. Antenna 210 is preferably of a size that allows a NATO prescribed fuse envelope to accommodate antenna 210. Antenna 210 is preferably approximately 76 millimeters (3 inches) in diameter and approximately 3 millimeters (one-eighth inch) in thickness. Furthermore, antenna 210 utilizes the outer casing 218 of fuse 104 and body 108 of shell 100 as an extension of ground plane 314, thereby improving grounding effectiveness. Thus, outer edge 418 of ground plane 314 contacts the interior surface 420 of outer casing 218 of fuse 104. Outer casing 218 of fuse 104 in turn contacts body 108 of shell 100 when fuse 104 is coupled to shell 100. Outer edge 422 of radiator 312 preferably contacts outer casing 218 of fuse 104. Antenna 210 is preferably linearly polarized.

Figure 5:
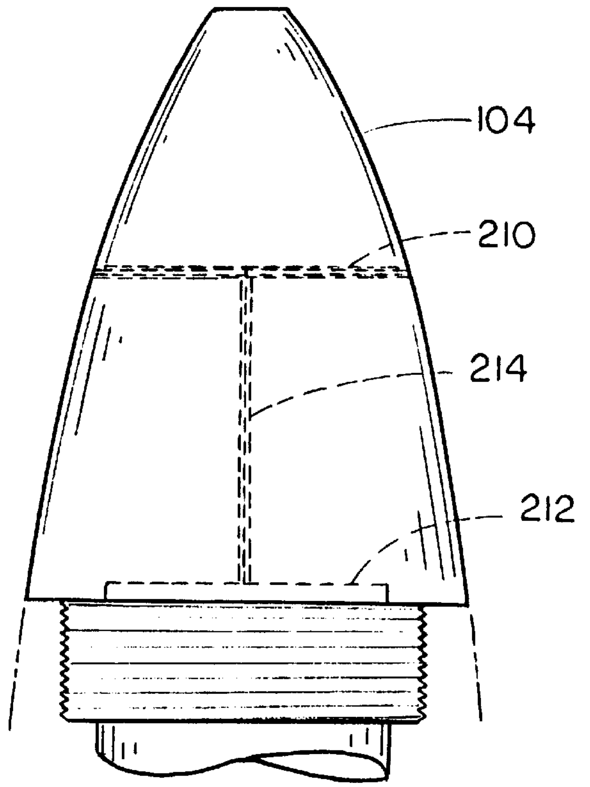
FIGS. 5–7 are illustrations of various positioning configurations of the antenna of the present invention with an artillery fuse.
Figure 6:
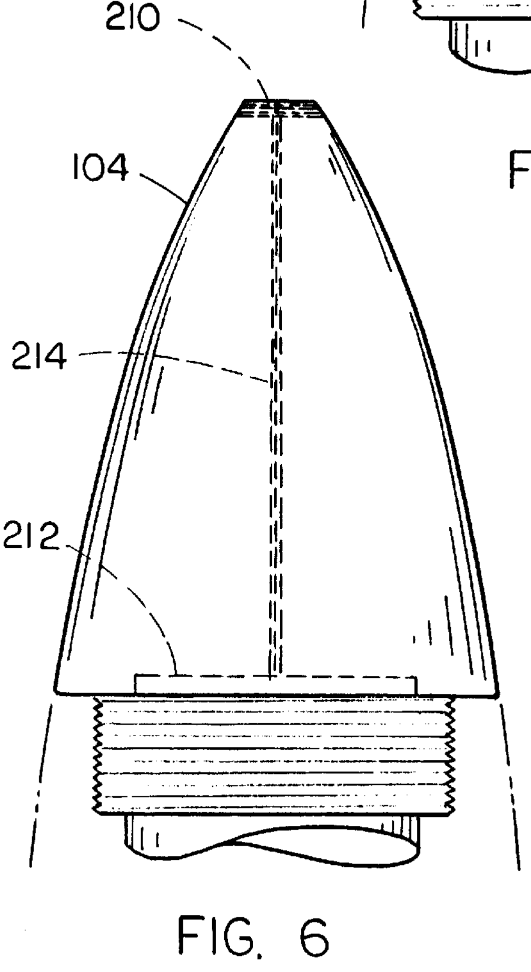
Figure 7:
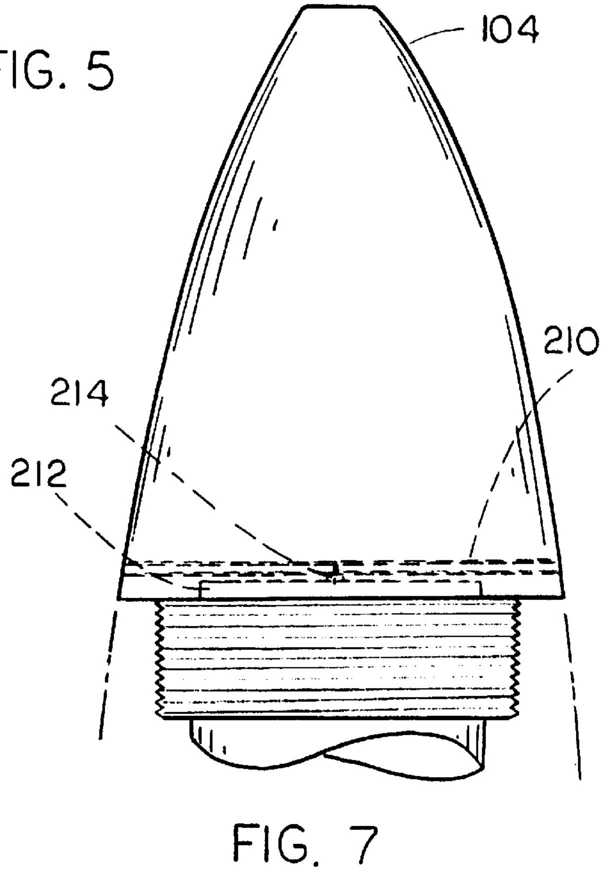

Referring now to FIGS. 5–7, various positioning configurations of the antenna of the present invention with a fuse are shown. FIGS. 5–7 depict various possible placement configurations of antenna 210 within fuse 104 as a function of the size of fuse 104 for a given size of antenna 210, or conversely as a function of the size of antenna 210 for a given size of fuse 104. FIG. 5 shows fuse 104 having antenna 210 disposed at a front end position within fuse 104. FIG. 6 shows fuse 104 having antenna 210 disposed at an intermediate position within fuse 104. FIG. 7 shows fuse 104 having antenna 210 disposed at a rear end position within fuse 104. The length of RF feed transmission line 214 and placement of electronic circuitry 212 may vary depending upon the positioning of antenna 210 within fuse 104.

Figure 8:
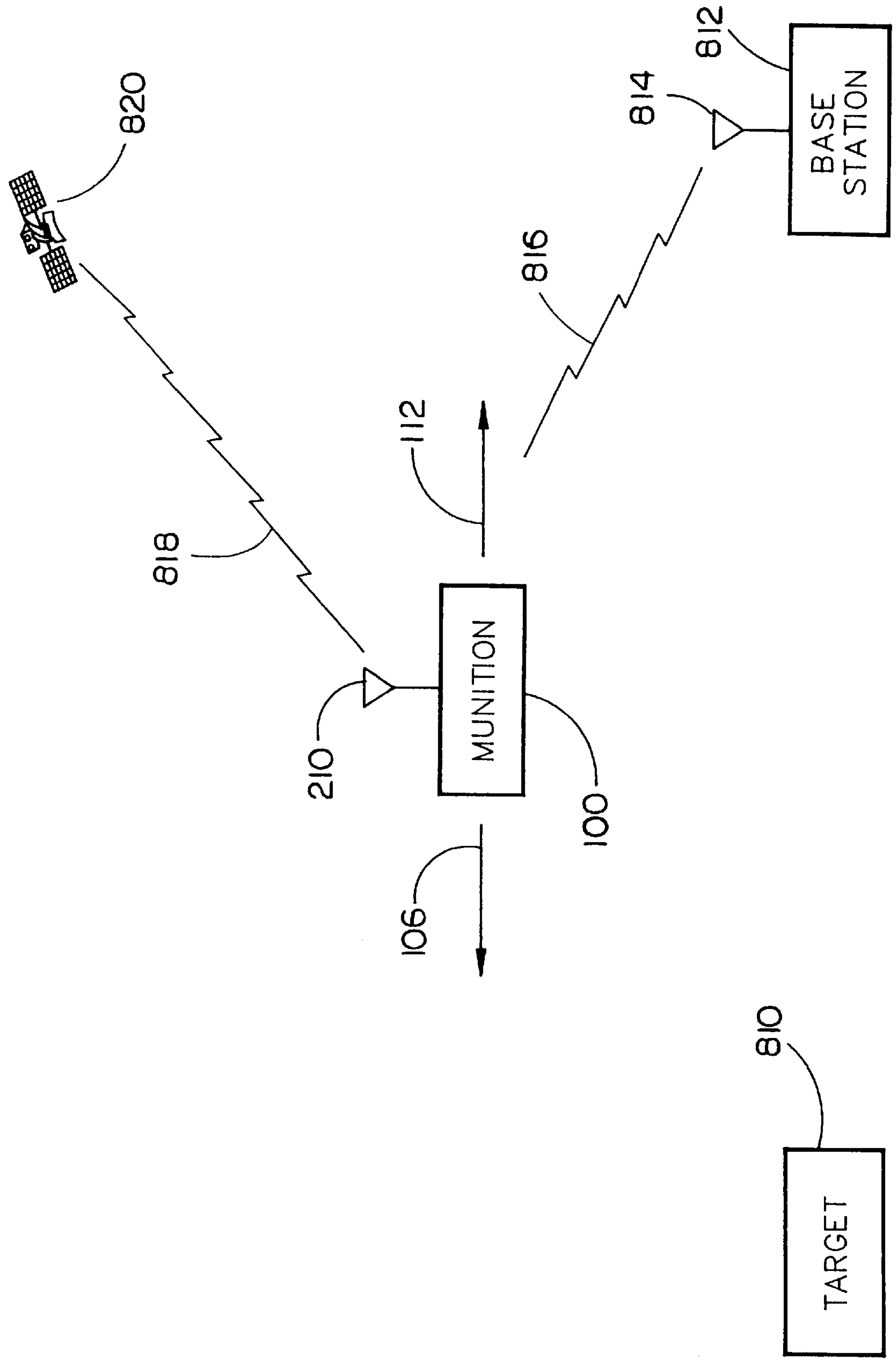
FIG. 8 is an illustration of a munitions telemetry system in which the antenna of the present invention may be utilized.

Referring now to FIG. 8, an application of the antenna of the present invention is shown. An artillery shell ("MUNITION") 100 is launched toward a target ("TARGET") 810, travelling in a forward direction 106 toward target 810. A base station ("BASE STATION") 812 is located within the vicinity of origin of artillery shell 100 in an aft direction 112 from shell 100 with respect to the forward direction of travel 106 of shell 100. Antenna 210 facilitates transmission of a radio-frequency telemetry signal 816 between shell 100 and a remote device such as base station 812. Base station 812 is provided with an antenna 814 for facilitating radio-frequency communications between shell 100 and base station 812. Further, antenna 210 facilitates reception of a positioning signal 818 received from a space vehicle 820 as part of a constellation of space vehicles in a global positioning system. The positioning signal 818 allows for the instantaneous position and trajectory of shell 100 to be defined and integrated with the telemetry signal 816 such that base station 812 may coordinate the guiding of shell 100 toward target 810 and the detonating of fuse 104.

Space vehicle 820 may be a satellite in the NAVSTAR global positioning system (GPS) maintained and operated by the U.S. government. The GPS system comprises a constellation of earth orbiting space vehicles that continuously transmit telemetry signals that provide time and position information to a receiver capable of receiving and decoding the telemetry signals. Thus, electronics 212 of fuse 104 may include a GPS receiver such that the instantaneous position and trajectory of munition 100 may be determined. Further, electronics 212 may include a transmitter or transceiver which relays the GPS time and position information of munition 100 to base station 812 for range correction and auto-registration purposes. The signal relayed between artillery shell 100 and base station 812 may be a pseudo-lite GPS signal, for example. Thus, utilization of fuse 104 so equipped and utilizing the antenna of the present invention allows artillery shell 100 to be utilized as a competent munition.

It is believed that the artillery fuse antenna of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An antenna, comprising:

a dielectric disk having upper and lower surfaces;

a first ground plane disposed on the upper surface of said dielectric disk;

a second ground plane disposed on the lower surface of said dielectric disk; and a plurality of apertures being spaced apart and radially disposed through said dielectric disk for coupling said first and second ground planes, said first and second ground planes each having a predetermined diameter wherein said plurality of apertures are selected according to the predetermined diameters of said first and second ground planes to provide a desired radiation property of the antenna such that the antenna is capable of being optimized for utilization in a projectile, the desired radiation property including a lower gain in a forward direction with respect to a direction of flight of the projectile, and a higher gain in an aft direction with respect to the direction of flight of the projectile, the desired radiation property being generated at least in part by current conducted by either one of said first and second ground planes being caused to flow on a surface of the projectile.

2. An antenna as claimed in claim 1, said dielectric disk having a diameter and a dielectric constant selected for operation at L-band frequencies.

3. An antenna as claimed in claim 1, said dielectric disk having a diameter and a dielectric constant selected for operation at S-band frequencies.

4. An antenna as claimed in claim 1, said dielectric disk having a diameter and a dielectric constant selected for operation at both L-band and S-band frequencies.

5. An antenna as claimed in claim 1, said plurality of apertures being of a number and having a diameter and spacing relationship selected for operation at L-band frequencies.

6. An antenna as claimed in claim 1, said plurality of apertures being of a number and having a diameter and spacing relationship selected for operation at S-band frequencies.

7. An antenna as claimed in claim 1, said plurality of apertures being of a number and having a diameter and spacing relationship selected for operation at both L-band and S-band frequencies.

8. An antenna as claimed in claim 1, wherein the antenna is centrally fed.

9. An antenna as claimed in claim 1, wherein the antenna has an impedance of approximately 50 ohms.

10. An antenna as claimed in claim 1, each one of the predetermined diameters of said first and second ground planes being equal to a respective diameter of the projectile.

11. An antenna as claimed in claim 1, said first and second ground planes of the antenna being coupled with first and second exterior surfaces, respectively, of the projectile.

12. An antenna as claimed in claim 1, said first and said second ground planes of the antenna each having a respective diameter such that a diameter of one of said first and second ground planes is greater than another diameter of another one of said first and second ground planes.

13. A fuse, comprising:

an outer shell having an interior portion and a base; and an antenna disposed within the interior portion of said outer shell generally parallel to said base, said antenna comprising a dielectric disk having upper and lower surfaces, a first ground plane disposed on the upper surface of said dielectric disk, a second ground plane disposed on the lower surface of said dielectric disk, and a plurality of apertures being spaced apart and radially disposed through said dielectric disk for coupling said first and second ground planes, said antenna providing a desired radiation property including a lower gain in a forward direction with respect to a longitudinal axis of the fuse, and a higher gain in an aft direction with respect to the longitudinal axis of the fuse, the desired radiation property being generated at least in part by current conducted by either one of said first and second ground planes being caused to flow on a surface of the fuse.

14. A fuse as claimed in claim 13, said outer shell having a conical contour and said antenna being shaped to conform to the conical contour of said outer shell.

15. A fuse as claimed in claim 13, said outer shell having an ogival contour and said antenna being shaped to conform to the ogival contour of said outer shell.

16. A fuse as claimed in claim 13, said outer shell being conductive and said first and second ground planes being coupled to said outer shell such that grounding effectiveness of said first and second ground planes is thereby enhanced.

17. A fuse as claimed in claim 13, said dielectric disk having a diameter and a dielectric constant selected for operation at L-band frequencies.

18. A fuse as claimed in claim 13, said dielectric disk having a diameter and a dielectric constant selected for operation at S-band frequencies.

19. A fuse as claimed in claim 13, said dielectric disk having a diameter and a dielectric constant selected for operation at both L-band and S-band frequencies.

20. A fuse as claimed in claim 13, said plurality of apertures being of a number and having a diameter and spacing relationship selected for operation at L-band frequencies.

21. A fuse as claimed in claim 13, said plurality of apertures being of a number and having a diameter and spacing relationship selected for operation at S-band frequencies.

22. A fuse as claimed in claim 13, said plurality of apertures being of a number and having a diameter and spacing relationship selected for operation at both L-band and S-band frequencies.

23. A antenna as claimed in claim 13, wherein the antenna is centrally fed.

24. A fuse as claimed in claim 13, each one of the predetermined diameters of said first and second ground planes being equal to a respective diameter of said outer shell.

25. A fuse as claimed in claim 13, said first and second ground planes of said antenna being coupled with first and second exterior surfaces, respectively, of said outer shell.

26. A fuse as claimed in claim 13, said first and said second ground planes of said antenna each having a respective diameter such that a diameter of one of said first and second ground planes is greater than another diameter of another one of said first and second ground planes.

* * * * *